June 22, 1926.
P. B. NEWKIRK
AUTOMATIC MOTOR CONTROL AND OIL PRESSURE GAUGE
Filed July 6, 1922    4 Sheets-Sheet 1
1,589,545
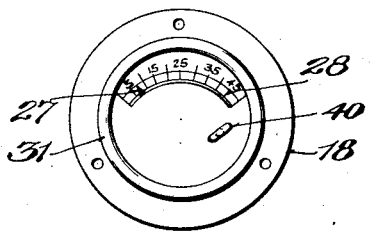
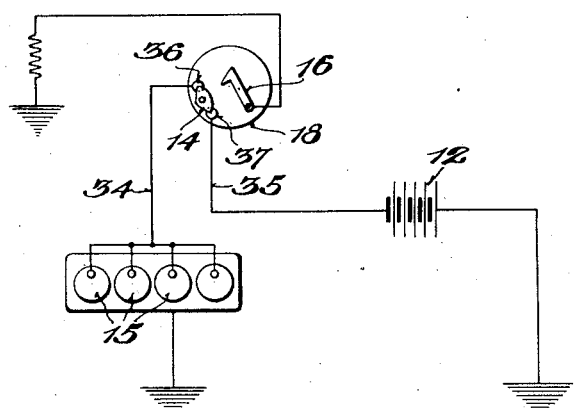
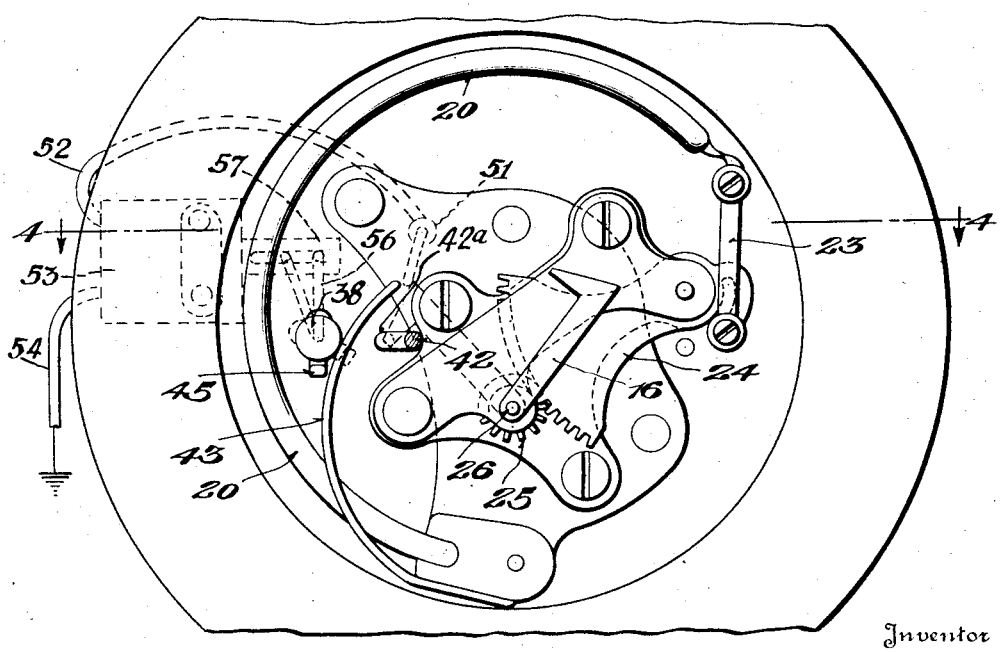
Inventor
Perry B. Newkirk,
WITNESS:-    By
Attorney

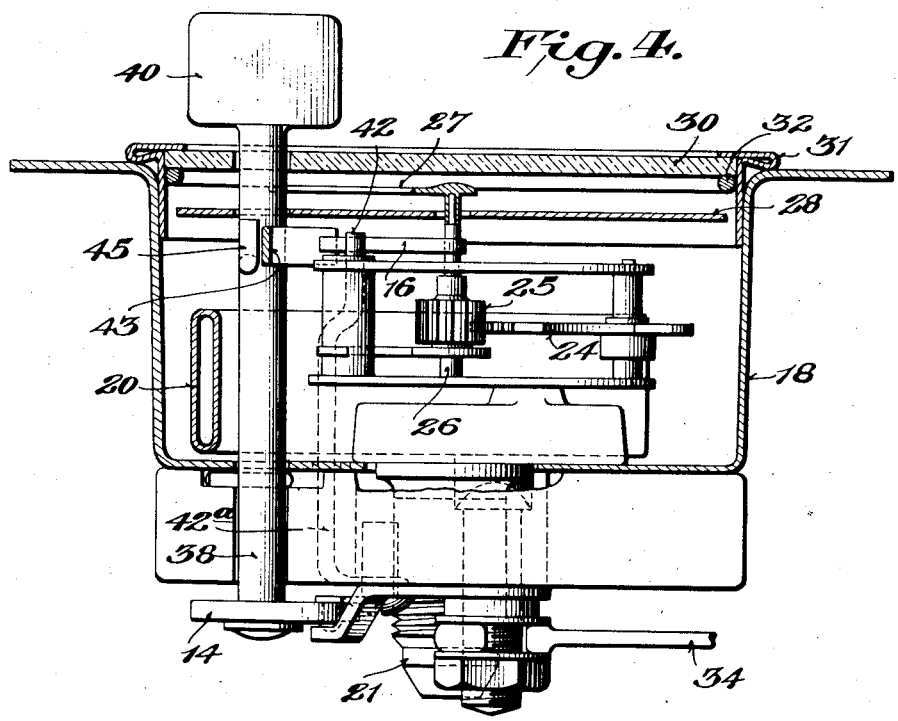
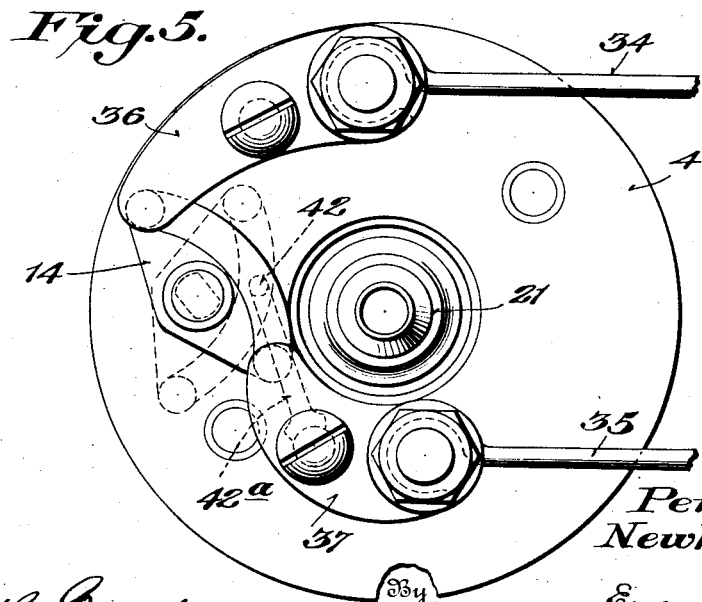

June 22, 1926. 1,589,545
P. B. NEWKIRK
AUTOMATIC MOTOR CONTROL AND OIL PRESSURE GAUGE
Filed July 6, 1922 4 Sheets-Sheet 3
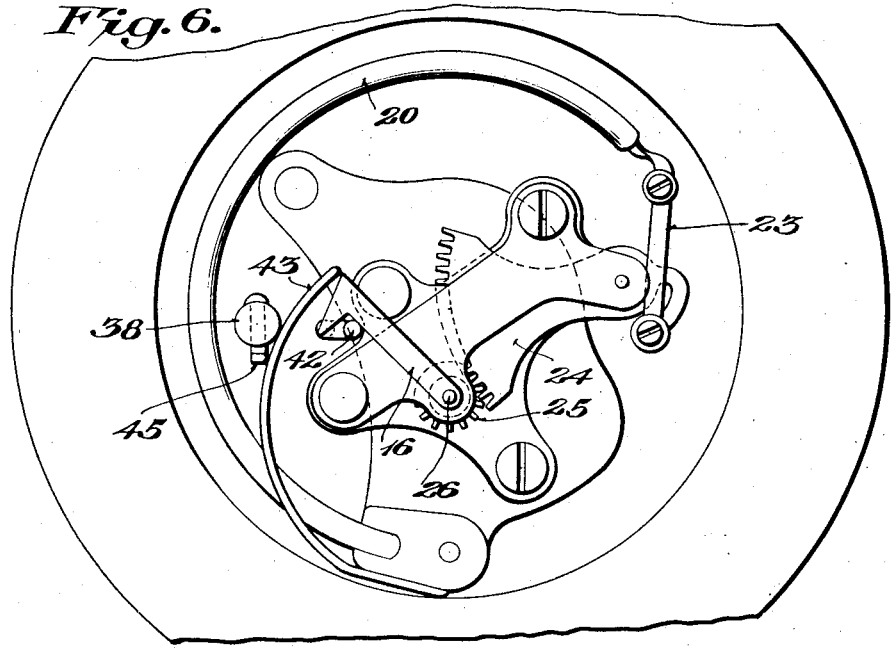
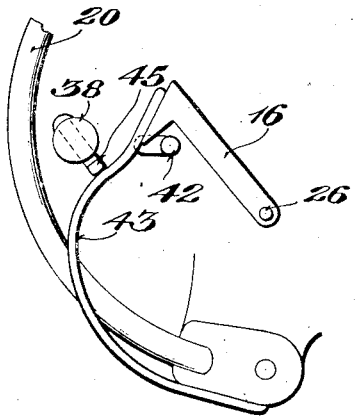
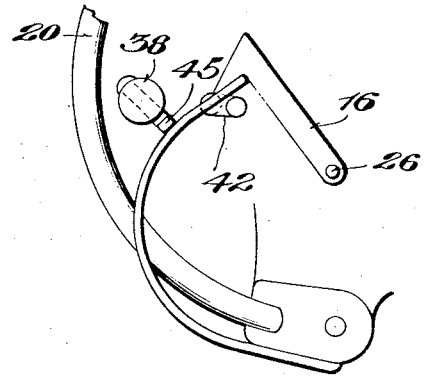
Inventor
Perry B. Newkirk,
WITNESS:—
Chas. L. Grieshauer
By
Eugene C. Brown
Attorney

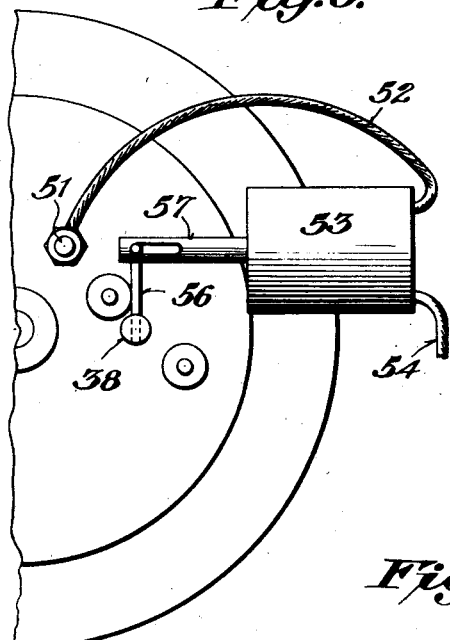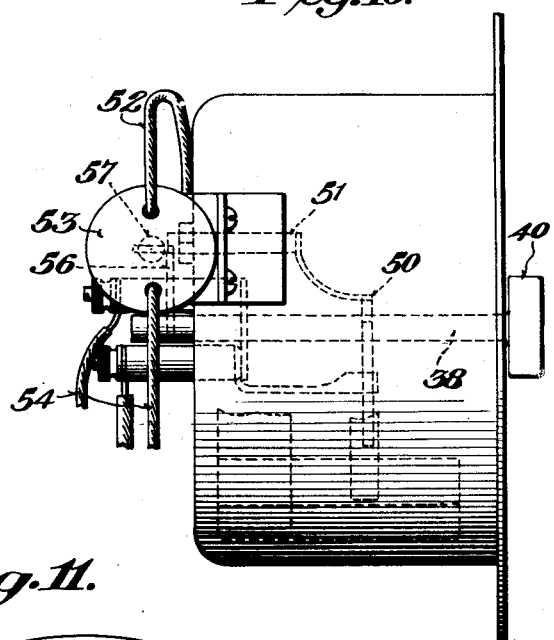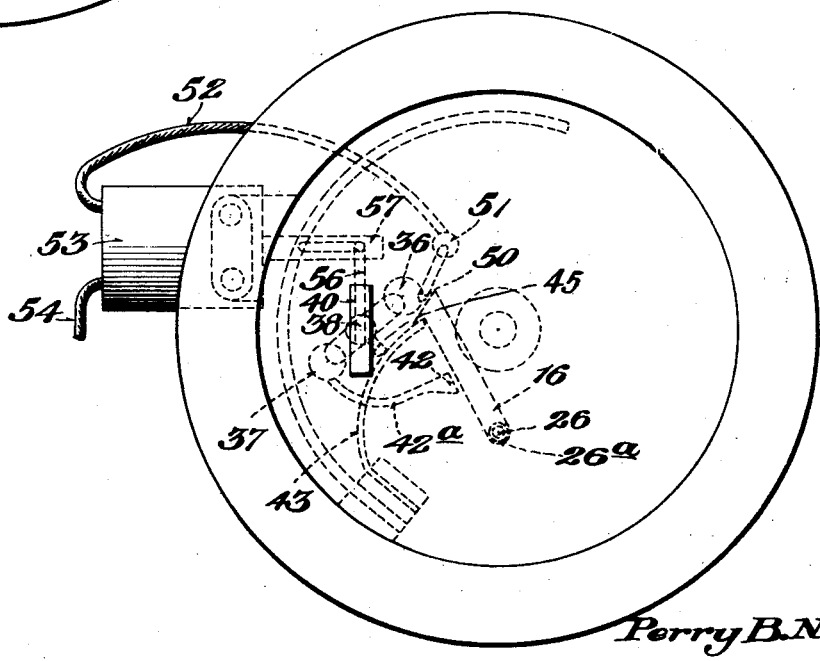

Patented June 22, 1926.

1,589,545

UNITED STATES PATENT OFFICE.

PERRY B. NEWKIRK, OF SEATTLE, WASHINGTON, ASSIGNOR OF ONE-HALF TO JOHN E. SCESE, OF PONTIAC, MICHIGAN.

AUTOMATIC MOTOR CONTROL AND OIL-PRESSURE GAUGE.

Application filed July 6, 1922. Serial No. 573,075.

This invention relates to a pressure controlled electric switch which is adapted to short circuit the ignition circuit of a motor vehicle in case the oil pressure fails and thereby stop the engine.

The object of my invention is to provide a switch mechanism which may be incorporated in the oil pressure gauges now in common use and may be either attached to existing pressure gauges or when embodied in the manufacture of new gauges, the latter may readily be inserted in the place of the old gauges without any other charge.

In the following description I shall refer
to the accompanying drawings, in which—
Figure 1 is a front elevation of the usual oil pressure gauge; Fig. 2 is a diagram of an engine ignition circuit with my automatic short circuiting switch installed in the pressure gauge; Figs. 3 and 6 are front elevations of a pressure gauge having my switch mechanism incorporated, the cover plate being removed; Fig. 4 is a transverse sectional view on the line 4—4 of Figs. 3 and 5; Fig. 5 is a rear elevation; Figs. 7 and 8 are enlarged detail views showing the switch elements in different positions; Figs. 9, 10 and 11 are respectively rear side and front elevations of a modified form of my invention.

In Fig. 2 I have shown a conventional diagram of an ignition circuit from the battery or source of current 12, through the main switch 14 to the spark plugs of the engine cylinders 15, the timer or distributer being omitted from the diagram. My short-circuiting member is indicated at 16 in the form of a pawl mounted on the indicator stem within the casing 18 of the pressure gauge.

The parts of the presure gauge have been shown in the usual manner and will be recognized by engineers. The Bourdon tubular spring 20 is mounted at its lower end, its bore being connected to the oil pressure system by means of a union secured to the threaded nipple 21 (see Fig. 4). The free end of the spring is connected by link 23 to the pivot end of a sector lever 24 having a segmental rack operating upon the pinion 25 on the indicator shaft 26 which moves the pointer needle 27 over the dial scale 28. The glass cover plate 30 is held in the cover frame 31 by a spring ring 32. All of these parts are of the usual construction.

My combined main switch and automatic pressure controlled short-circuiting device are incorporated in the oil pressure gauge as follows: The conductor leads 34 and 35 of the ignition circuit are connected to switch plates 36 and 37 secured to the back of the casing but insulated therefrom. The switch blade 14 of the manually operated main switch is secured to the rear end of the stem 38, having on its front end the turning knob or switch button 40. In Fig. 5 the switch blade 14 is shown in full lines in the running position and in dotted lines in the off position.

I attach the short circuiting switch member or pawl 16 to the indicator shaft 26 so that it is actuated in unison with the pointer needle by the sector lever in accordance with the pressure changes in the Bourdon tube 20. When full pressure is on, the pawl 16 will be in the position indicated in full lines in Fig. 3, and when the pressure falls it will swing over to the position indicated in Fig. 6.

In the path of the pawl is a stop contact 42, which may constitute the outer end of a wire or rod 42ª, secured to the switch plate 37. A spring arm 43 fastened at its lower end, is positioned so that its free end is normally out of the path of the pawl, as indicated in Figs. 3 and 6, the main circuit closing or main switch being then in running position. When the switch is turned to "off" position, a cam lug 45 on the stem 38 engages the spring arm and forces it over into the position indicated in Fig. 8, so that the end of the arm will pass under the catch on the pawl 16 when the latter is moved over into "no pressure" position.

In operation, when the oil pressure is operating under normal pressure, the pawl is maintained in the position shown in Fig. 3, the main switch being shown in the running position in this figure. If the oil pressure should fail for any reason, such as low oil supply, broken pump or a broken or plugged oil line, the Bourdon tube will cause the pawl 16 to swing over into the position indicated in Fig. 6, thereby bringing the pawl into engagement with the contact 42. In the arrangement shown in Figs. 2 and 6 the pawl is grounded and the battery will now be short-circuited or grounded through conductor lead 35, rod 42ª, and the auxiliary short-circuiting switch comprising the stop contact 42 and pawl 16, thus cutting off the current from the spark plugs and stopping the engine. The ground connection can be made of such low resistance that the current will be practically shunted and yet not absolutely short-circuit the battery. By turning the button 40 to rotate the switch blade 14 into the "off" position the cam lug 45 forces the outer end of the spring arm 43 against the bevelled outer end of the pawl 16 in the manner indicated in Fig. 7. The inclined bent end of the spring exerts a pressure upon the bevelled end of the pawl which causes it to move from under the spring and then fall back with the spring under the catch as indicated in Fig. 8. The pawl is thus separated from the contact 42 and prevented by the spring arm from again engaging it, so that the short circuiting path is broken. Therefore, when the trouble has been eliminated, the button 40 may be turned to close the main switch to again start the engine. Likewise if the trouble was caused merely on account of low oil supply, the engine may be started after the parts have been first moved into the position shown in Fig. 8 to break the short-circuit, by then turning the main switch back into starting position, so that the operator may drive his car cautiously for a distance sufficient to reach an oil supply store or station.

It is evident that the spring arm 43 will always be moved over into the path of the pawl when the switch is in the "off" position. Hence, when the motor is stopped, and the oil pressure falls, the pawl will be arrested in the position shown in Fig. 8 without coming into engagement with the contact 42 and consequently the battery will not be short-circuited, so that there will be no danger of discharging it while the car is not in use.

I have shown in Figs. 3, 9, 10, and 11, means for automatically opening the main switch immediately after the pawl 16 has short-circuited the ignition system and stopped the engine. In this case the short circuiting pawl 16 is insulated as by sleeve 26ª from the shaft 26. An auxiliary contact 50 carried by a terminal post 51 is located in the path of the pawl 16. The post is connected by wire 52 to one terminal of a solenoid 53, the other terminal 54 being grounded. A pin 56 projecting from the stem 38 of the main switch is operatively connected to the plunger or core 57 of the solenoid. When, therefore, the pawl 16 swings to the left upon failure of the oil pressure, it engages simultaneously with contacts 42 and 50, thereby forming a shunt circuit from the battery through conductor 35, main switch plate 37, contact 42, pawl 16, contact 50, port 51, and solenoid 53 to ground, thereby shunting the ignition system. The solenoid immediately draws in its plunger, rotating the shaft 38 and shifting the switch blade 14 from dotted line position to full line position in Fig. 11, thereby opening the main circuit between the switch plates 36 and 37 and stopping the engine. This automatic opening of the main circuit eliminates all danger of discharging the battery. The stem 38 may be provided with a cam lug 45, as shown in Figs. 3 to 8, to cause the pawl 16 to back off and permit the spring arm 43 to pass under the notch of the pawl in the manner indicated in Figs. 7 and 8 to thereby separate it from the contacts 42 and 50, so that the ignition circuit may be closed upon again turning the main switch into starting position.

I claim:—

2. An automatic short circuiting device, comprising a pivotally mounted fluid pressure controlled member, a stop contact connected to the main circuit and positioned in the path of said member, a resilient arm normally out of the path of said member, and a main switch having means for moving said arm into the path of said member when said switch is moved to its "off" position.

2. An automatic short circuiting device, comprising a pivotally mounted fluid pressure controlled member, a stop contact connected to the main circuit and positioned in the path of said member, a resilient arm normally out of the path of said member and a main switch having means for moving said arm against said member when the latter is in contact with said stop contact to cause said resilient arm to move said member away from said stop contact and maintain it separated therefrom.

3. An automatic short circuiting device, in combination with an oil pressure gauge having an indicator shaft, comprising a short circuiting member mounted upon the indicator shaft of the gauge, a stop contact connected to the main circuit and positioned in the path of said member, a resilient arm normally out of the path of said member, and means for moving said arm into said path to prevent the engagement of said member with said stop contact.

4. An automatic short circuiting device, in combination with an oil pressure gauge having an indicator shaft, comprising a short circuiting member mounted upon the indicator shaft of the gauge, a stop contact connected to the main circuit and positioned in the path of said member, a resilient arm normally out of the path of said member and means for moving said arm against said member when the latter is in engagement with said stop contact, thereby causing the yielding pressure of said arm to separate said member from said stop contact and maintain it separated therefrom.

5. An automatic short-circuiting device, in combination with an oil pressure gauge having an indicator shaft, comprising a short circuiting member mounted upon the indicator shaft of the gauge, a stop contact connected to the main circuit and positioned in the path of said member, said member serving to ground the main circuit upon engaging said stop contact, and an electromagnetically actuated switch operating to open the main circuit when thus grounded.

In testimony whereof I affix my signature.

PERRY B. NEWKIRK.